H. CONKLIN.
Cotton Gin.
No. 1,168.  Patented June 7, 1839.
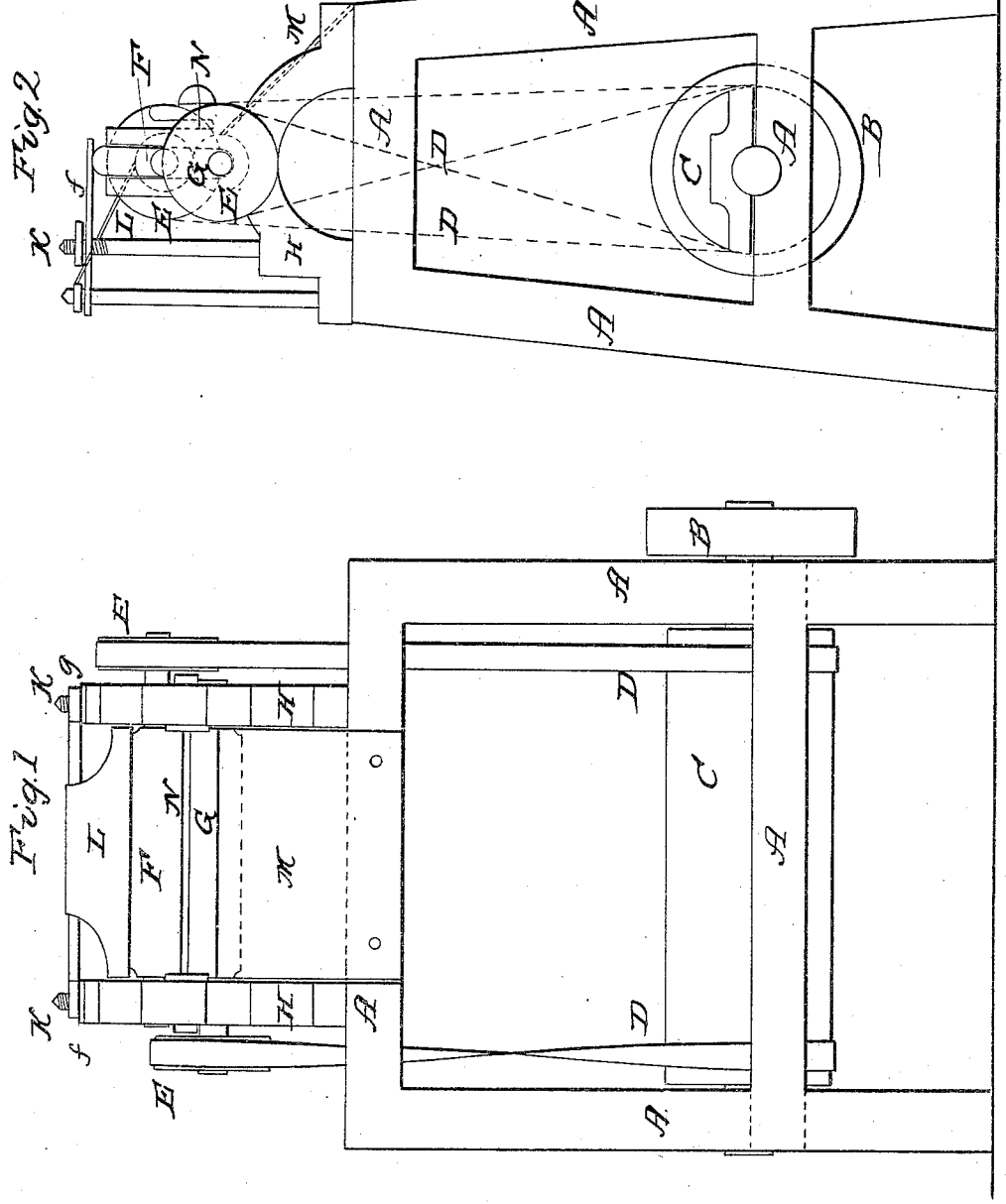

UNITED STATES PATENT OFFICE.

HENRY CONKLIN, OF POUGHKEEPSIE, NEW YORK.

IMPROVEMENT IN COTTON-GINS.

Specification forming part of Letters Patent No. 1,168, dated June 7, 1839.

*To all whom it may concern:*

Be it known that I, HENRY CONKLIN, of Poughkeepsie, Dutchess county, and State of New York, have invented a new and useful Improvement in the Machine for Ginning Cotton or for Separating the Seeds from Cotton, which I call the "Improved Cotton-Gin;" and I do hereby declare that the following is a full, clear, and exact description, viz:

A frame of wood or iron, length three feet, width at top about fifteen inches, at base about two feet, height two feet four inches; two stands or carriages fixed on the above about twelve inches apart and eight inches in height, to receive two rollers about one and one-half inch diameter, made of wood, iron, or other metallic substance, with a pulley on each roller at opposite ends, driven with belts connected with a drum. These rollers are kept close together by springs constantly pressing on the journals of the upper roller, so as to form revolving punches; and directly in front of the said two rollers, and close to the junction of them, is fixed a detainer about three thirty-seconds part of an inch in diameter, to stop the seed of the cotton from coming in contact with the rollers, and by that means preventing the crushing of the seed by the rollers while the rollers draw the cotton from the seed. This detainer may be made of iron or any other substance, and is so strained tight between the two stands by screws, or in any other manner that will answer the purpose. And further to enable others skilled in the art to make and use my invention I will proceed to describe its construction and operation, reference being had to the drawings annexed.

Figure 1 is a front view of the said machine. Fig. 2 is a side view with the various parts in dotted lines.

A A A A, Fig. 1, and A A A A, Fig. 2, represent the frame.

In Fig. 1, B is the driving-pulley on same shaft as the drum C, which is connected by belts D D to the pulleys E E, fixed on the shafts of the rollers F G. The said rollers revolve in the stands H H. The roller F is pressed down on roller G by the springs I I, being tempered or adjusted by the screws K K.

I is a piece of tin or any other substance to stop the cotton from lapping round the roller F. M is a similar piece for the same purpose, resting on the roller G, and to keep the seed fter being extracted from mixing with the cotton.

N is a detainer fixed close to and between the rollers F and G, the ends of said detainer being fixed in the stands H H.

The same letters are upon similar parts of the said machine in Fig. 2.

Now what I claim as my invention, and desire to secure by Letters Patent, is—

The detainer placed in front of the rollers, as heretofore described.

HENRY CONKLIN.

Witnesses:
S. E. HAIGHT,
HENRY WHINFIELD.